G. J. WILLETT.
SAFETY GUARD FOR EMERY WHEELS.
APPLICATION FILED AUG. 18, 1913.
1,116,658.
Patented Nov. 10, 1914.
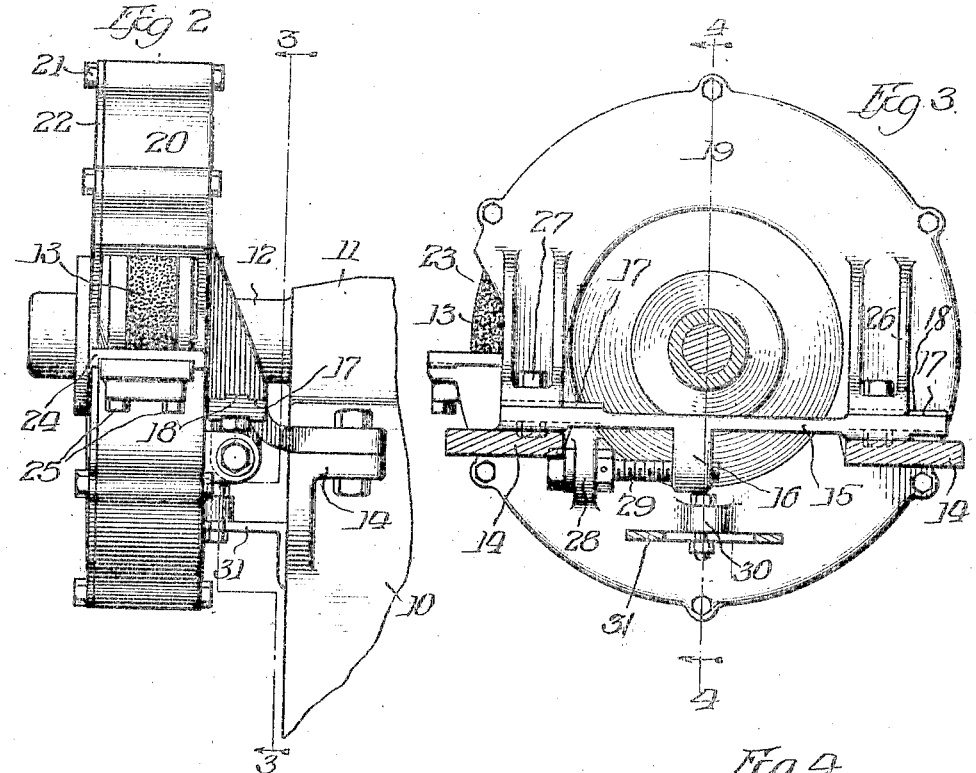
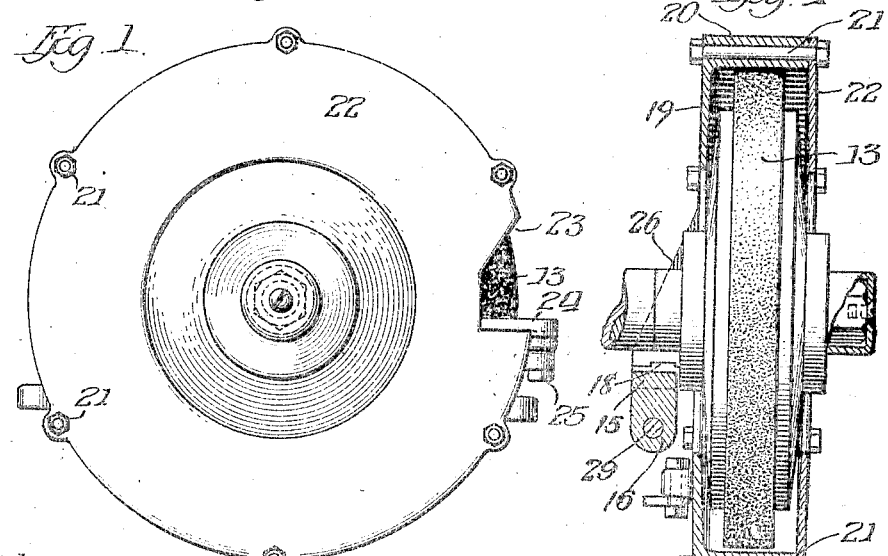
Witnesses:
Inventor: George J. Willett

UNITED STATES PATENT OFFICE.

GEORGE J. WILLETT, OF MILWAUKEE, WISCONSIN.

SAFETY-GUARD FOR EMERY-WHEELS.

1,116,658.  Specification of Letters Patent.  Patented Nov. 10, 1914.

Application filed August 18, 1913. Serial No. 785,321.

*To all whom it may concern:*

Be it known that I, GEORGE J. WILLETT, a citizen of the United States, residing at Milwaukee, in the county of Milwaukee and State of Wisconsin, have invented certain new and useful Improvements in Safety-Guards for Emery-Wheels, of which the following is a specification.

My invention relates to safety guards for emery wheels and has particular reference to a novel casing adapted to cover substantially the entire wheel.

It is not unusual in practice for emery wheels to become broken and to cause serious injury to workmen by flying pieces. This has been sought to be overcome in many ways, some of the forms of guards being quite satisfactory. However, I believe that none of the forms provide for a complete inclosing of the wheel together with means for adjusting the guard as the face or periphery thereof wears away.

One of the objects therefore, of my invention is to provide an inclosing guard for an emery wheel together with means for adjusting the guard to keep the cutting surface of the wheel in proper position for work.

Another object is to provide means whereby such a guard may be adjusted only to a limited extent to the end that a wheel may be used on the same arbor for only a portion of its life. It is common in many shops to provide the emery wheel arbor with two speeds, a low speed for a large wheel and a higher speed for the wheel when its surface becomes worn down, to the end that substantially the same peripheral speed may be obtained irrespective of the diameter of the wheel. This works successfully unless the operator fails to change the speeds when a new large wheel is applied. If the speed is not changed the wheel is almost sure to burst. In my construction I provide but a single arbor speed and allow for adjustment of the guard whereby to utilize only a portion of the wheel. When the limit of adjustment of the guard has been reached the wheel is taken off and placed on an arbor designed for a smaller wheel and a corresponding guard placed thereon. For instance, in the preferred form of my guard, I provide for an adjustment of two inches. A twenty-four inch wheel may thus be used until its diameter is twenty inches. It is then removed and placed on an arbor designed for a twenty inch wheel with a guard constructed accordingly. It is used on this arbor until four inches of the diameter has been worn away whereupon it is removed and placed on an arbor designed for a sixteen inch wheel and so on until the wheel is completely worn. This reduces loss in breakage and avoids the possibility of injury due to excessive speeds.

My novel guard is preferably composed of three steel castings, an adjusting screw and a tool rest. The inclosing guard castings are made thick, the peripheral wall being three-fourths of an inch and the side walls one-half an inch thick to prevent the possibility of the portions of the wheel breaking through in case the wheel should burst. Not only does such a guard obviate the danger due to the bursting of the wheel but it enforces the use of the wheel in such position that sparks from the wheel cannot cause injury either to the workman or associates.

The invention will be more readily understood by reference to the accompanying drawings, wherein, Figure 1 is a side view of an emery wheel inclosed in a guard such as contemplated by me; Fig. 2 is an edge elevation of the construction shown in Fig. 1; Fig. 3 is a sectional elevation taken on the line 3—3 of Fig. 2, and, Fig. 4 is a transverse vertical section taken on the line 4—4 of Fig. 3.

Referring more particularly to the drawings it will be seen that I provide a standard 10, having a bearing 11, for an arbor 12. To this arbor is secured in the usual manner an emery wheel 13. On the standard 10, I provide brackets 14, to which is secured a casting 15, having a depending apertured lug 16, and two machined upper surfaces 17, finished to provide a rib 18.

The casing forming my novel guard is composed of a steel casting having a web 19, and a peripheral flange 20, this flange being apertured at intervals to accommodate bolts 21, by means of which the face plate 22, is secured to the flange. The web 19, flange 20 and face plate 22, are cut-away at 23, to expose a portion of the emery wheel 13, and the work performed by the wheel is carried on through this cut-away portion. A tool rest 24, is secured to the casing by suitable bolts 25, this tool rest being renewable as required when worn. Projecting inwardly from the web 19 are brackets 26, having machined lower surfaces providing a groove fitting the rib 18 on the casting 15, the construction being such that the casing may be slid on the casting 15 by loosening the bolts 27. Also projecting inwardly from the web 19 is a bracket 28, apertured to accommodate an adjusting bolt 29, which bolt is threaded into the apertured lug 16, on the casting 15. By means of the bolt 29, the casing may be moved transversely of the wheel arbor as required. To provide a further support for the casing I cast an additional bracket 30, on the web 19, at the lower portion thereof, this bracket coöperating with a slotted bracket 31, secured to the standard 10. It will be noted that the notch or cut-away portion 23, is provided on a horizontal line coincident with the wheel arbor. This is suitable for certain classes of grinding. It will be understood, however, that the cut away portion may be provided at other points and may be of different form as required for varieties of work. This, together with other modifications such as would occur to those skilled in the art, I consider within the scope of my invention.

I claim:

In a device of the class described, the combination of a support, an arbor carried by said support, a grinding wheel mounted on said arbor, a casing substantially entirely surrounding said grinding wheel and provided with a notch whereby a portion of said grinding wheel is exposed, a pair of brackets extending inwardly from said casing, said brackets having a sliding engagement with said support, and screw means for adjusting said casing transversely of said arbor, substantially as described.

GEORGE J. WILLETT.

Witnesses:
E. G. GRAENYA,
W. J. KAYE.